United States Patent [19]

Bécsy et al.

[11] Patent Number: 4,741,122

[45] Date of Patent: May 3, 1988

[54] PROCESS AND APPARATUS FOR STERILE AND/OR PARTIALLY STERILE PREPARATION, INOCULATION AND BAGGING OF MUSHROOM SUBSTRATUM

[75] Inventors: Márton Bécsy; Magdolna Kopcsányi; László Bognár; Ferenc Major; Kálmán Sunyovzsky, all of Budapest, Hungary

[73] Assignee: Coopex/Innovocoop, Budapest, Hungary

[21] Appl. No.: 874,129

[22] Filed: Jun. 13, 1986

[51] Int. Cl.⁴ .............................................. A01G 1/04
[52] U.S. Cl. ............................................ 47/1.1; 71/5
[58] Field of Search .............................. 47/1.1; 71/5

[56] References Cited

U.S. PATENT DOCUMENTS

| | | | |
|---|---|---|---|
| 4,059,919 | 11/1977 | Green | 47/1.1 |
| 4,204,364 | 5/1980 | Maul et al. | 47/1.1 |
| 4,263,744 | 4/1981 | Stoller | 47/1.1 |

*Primary Examiner*—Robert E. Bagwill
*Attorney, Agent, or Firm*—Schweitzer & Cornman

[57] ABSTRACT

The process and apparatus according to the invention are suitable for sterile and/or partially sterile preparation, inoculation and bagging of mushroom substratum. The joint application of the process and apparatus enables the use of agricultural wastes and the production of substratum in reduced time so that the yield can be multipled compared with the practices known so far and the expenditures are lower than those known so far.

In the course of the process according to the invention dry straw and/or corn-cob are comminuted to the required size and admitted together with additive into a closed system. The material is treated with 90° C. hot water until 70% moisture content is reached in the first step, while it is continuously mixed, then it is sterilized by heating for 35 minutes. Next the material is cooled to 25° C. and the internal pressure of the apparatus is equalized to atmospheric pressure. This is followed by inoculation of the basic material from partially sterile chamber with inoculum of 1.5 mm grain size. After mixing for 5 minutes the so-prepared material is bagged in partially sterile space for the purpose of interweaving of cultivation, then it is sealed. The apparatus according to the invention is formed with a double walled cylindrical jacket of narrowing extension provided with lid, hermetically sealed and mixing worm is arranged in its centreline. The apparatus is provided with inlet and outlet valves and pipe system for the basic material, inoculum, steam water and air. During operation of the apparatus the mixing of the material is solved with bi-directional mixing while it is being sterilized and the inoculum ground.

The process and apparatus are capable to produce mushroom varieties of higher yield and more sought-after on the market and at a more favorable cost than those produced with the practice and efficiency known so far.

7 Claims, 1 Drawing Sheet

PROCESS AND APPARATUS FOR STERILE AND/OR PARTIALLY STERILE PREPARATION, INOCULATION AND BAGGING OF MUSHROOM SUBSTRATUM

BRIEF SUMMARY

The invention relates to a process and an apparatus for sterile and/or partially sterile preparation, inoculation and bagging of mushroom substrate. The use of the process and apparatus of the present invention enables the utilization of agricultural wastes, faster production of substrate, a yield exceeding several times that of the known processes, all at considerably lower cost.

BACKGROUND

As known, certain mushroom varieties, e.g. pleurotus ostreatus (oyster mushroom) can be cultivated on trees, cereals and on various agricultural byproducts. Various methods are known for preparation of the substrate required for cultivation. Each method is aimed at producing favorable conditions in the substrate for the cultivation of the mycelium of the mushroom. In the course of this, the substrate of the mushroom contains nutrients and water. In addition, the preparation seeks to eliminate or substantially reduce the many other competing microorganisms such as mildews, bacteria in the raw material, and to eliminate their conditions of existence. Thus, the mycelium of the mushroom inoculated into such substrate will grow quickly without competition. So the substrate is produced from dry raw materials by wetting, then by elimination of the detrimental effect of the competing microorganisms. After inoculation, the substrate so prepared is interwoven. The interwoven material is used for further inoculation, this inoculum in interwoven condition is used for fodder, or for mushroom cultivation.

Three methods of the most frequently used heat treatment are known for reducing the detrimental microorganisms from following the wetting. The first heat treatment method is aimed at propagation of the thermophile bacteria in the substrate for providing the required protection. In the course of this heat treatment, the wetted raw material is heated to max. 60° C. temperature, incidentally to 70° C., for 2-3 hours, against insect pests, followed by cooling below 60° C., then it is held at 50°-55° C. for 2-3 days under adequate airing. In this case, the thermophile bacteria propagating in very large quantity consume the nutrients mostly of the mildews and other microorganisms, as a result of which a cetain degree of protection is developed in the substrate. According to this method, the wetted raw material is heated by steam, or immersion into hot water or by the socalled mass heat treatment. After cooling to under 30° C., the heat treated substrate can be inoculated with mycelium without special hygienic conditions. Then it is bagged into packing material, is interwoven and is ready for use.

According to the second method of heat treatment, the wetted raw material is heated to 70°-100° C. in the course of the partial sterilization and is held there for 1-6 hours. In this case, the pests in the raw material and the vegetative forms of the competing microorganisms are destroyed, except those present in persistent spore form. Following the holding time, the substrate is quickly cooled below 30° C. and is inoculated with the mycelium of the selected mushroom. Strict hygienic conditions are required for the inoculation, since the partial sterilization does not protect the substrate against the reinfecting organisms arriving from the air, or from other accessories. After inoculation and bagging, strict hygienic conditions have to be maintained for the substrate also during interweaving. Therefore, the packing material should be sealed to insure adequate sterility. The interwoven material protects itself against infections, and thus the cultivation takes place under normal circumstances.

The third kind of heat treatment is the sterile method. Here the wetted raw material is filled and sealed into suitable packing material, then together with the packing material it is heated to and held at 110°-135° C. under autoclave pressure. Under the effect of this temperature, the pests and all microorganisms, that is fungi, spores, and bacteria present in the raw material are destroyed. Then the autoclave together with the substrate is cooled to a predetermined temperature, followed by taking the packing material out of the autoclave and cooling it to under 30° C. Then the packing material is opened and the substratum is inoculated with mycelium under very strict hygienic conditions, then sealed again under sterile conditions. Thereafter the substrate is interwoven and put to use. This method is suitable mainly for the production of inoculum.

For the technical realization, preparation, inoculation and bagging of the sterile substrate, the following methods and accessories that are described below are used.

The comminuted or fine grained raw material e.g. grain of wheat is first wetted or precooked for the purpose of adequate water intake. The wetting is carried out generally manually by sprinkling and mixing, and in case of large quantities with the use of conveyors such as belts, etc. Various intermittent and continuous cooking appliances are used for precooking of the granular raw material. After cooking and drying, the prewetted and cooked material is filled generally by hand into packing material, most frequently into preserving bottles, then sealed manually under sterile conditions. The bottles are placed into autoclaves possibly by the use of a lifting basket, then sterilized under suitable pressure and temperature. After the holding time, the bottles in the autoclave are cooled to a desired temperature, then are removed from the autoclave and allowed to cool naturally to the inoculation temperature. Thereafter the bottles are opened manually under sterile conditions, the substrate is inoculated manually with grain germ or inoculating rod, then the bottles are sealed again by hand. This is followed by interweaving of the substrate at the proper place. Such apparatus and accessories are described e.g. in the book of Szili, I.—Vessey, E. titled: "Household cultivation of champignon and other mushrooms", 1980, p. 185-204.

The nearly sterile heat treatment of the substrate is carried out in smaller quantities also in autoclaves, similarly as before, but at a lower temperature. The inoculation and interweaving are the same as those described for the sterile method. In the case of large quantities, the wetted raw material is filled into boxes or plastic bags in heat insulated steaming premises and is then heated by steam to the required temperature, then held at that temperature, followed by cooling down quickly with air current. The heat treated substrate is carried out of the steaming premises. It is spread out and inoculum is mixed in either by machine or manually, then filled again into boxes or bags. The inoculation may take place in packing material used in the steamer with the insertion of inoculating rod or with inoculation by hand. After inoculation, the bags are sealed by a sterile method. The inoculation takes place in both cases under strict hygienic conditions. Then the substrate is interwoven under increased hygienic conditions.

Drawbacks of the prior art practices are that the processes and apparatus used for preparation, inoculation and bagging of the sterile and nearly sterile substrate are known only separately for each step. Another drawback is that the above manufacturing phases were carried out in separate locations, using different apparatus. Accordingly, these processes required much handling and several manual steps. Further drawbacks of the prior art processes are connected with the sensitivity to infection of the heat treated substrate received from the surroundings, namely that each process, namely transfer and opening entails an increased infection hazard. The autoclave processes have an additional drawback that due to the unfavorable heat transfer conditions only small units, that is maximum 5 liters can be heat treated, and even that with unnecessarily high energy utilization. Cleaning of the bottles before they are used again represents additional cost. Further drawback of the prior art methods is the great deal of manual work, the great deal of material handling required, which all unfavorably influence the cost and the economic efficiency of these prior art methods. These drawbacks are increased in the case of large scale production. For this reason the sterile process is economical in industrial quantities only for the production of mushroom germ. Large scale preparation, inoculation and bagging of substrate for mushroom cultivation could not be developed either with sterile or partially sterile method for want of suitable process and apparatus.

DESCRIPTION

The present invention is aimed at the elimination of above drawbacks with the development of process and apparatus for the sterile and partially sterile preparation, inoculation and bagging of the substrate, whereby the wetting, heat treatment of the raw material, inoculation and bagging of the substrate are carried out with minimal material handling, low energy utilization, minimal human labor, while reducing the infection hazard of the substrate and ensuring economical large scale applicability.

The present invention relates to a process for the sterile and/or partially sterile preparation, inoculation and bagging of substrate, in which the known basic material, suitably straw and/or corn cob are prepared by cutting and grinding it for the substrate. The ground material is mixed with the necessary additives and then is wetted with water, then partially sterilized by heating and fermentation, followed by inoculation and interweaving of the substrate, then the interwoven material is placed into the cultivation space. This process involves cutting, grinding of the basic material, suitably straw and/or corn cob to less than 5 and 6 mm respectively. Then organic and/or inorganic additives, suitably soya flour as nitrogen source, are added to the so prepared material according to given formula depending on the mushroom to be cultivated. Then the material is introduced into a closed system and mixed at the speed of 60 r.p.m and meanwhile at least 90° C. hot water is added to the material to obtain 63% moisture content which is then increased to the required 70% moisture content. For further increasing the moisture content by 7-10%, preferably by 7.5%, and heating to 100°-120° C., preferably to 115° C. steam is admitted for 5-30 minutes, suitably for 15 minutes. Then the so prepared basic material contained in the closed system is sterilized at 100°-120° C., preferably at 115° C. by steam, for 30-60 minutes, preferably for 35 minutes. The sterilization is followed by cooling the basic material to a temperature between 20° and 30° C., preferably to 25° C., with coolant conducted to the external surface of the closed system, while the agitating mixing motion and speed are maintained. After cooling, the internal pressure in the closed system is equalized to the atmospheric pressure. At the same time inoculum of 1-3 mm, preferably 1.5 mm particle size is admitted from the sterile space into the closed system. The basic material is mixed at the speed of about 30 r.p.m. for 5-15 minutes, preferably for 5 minutes, then the mixture in the nearly sterile space is admitted into a closed, sterile storage unit for interweaving or cultivation and then the storage unit is sealed.

The apparatus used for carrying out the process of the present invention is provided with a lid and a hermetically sealed interior confined by cylindrical jacket, the lower part of which is shaped as a narrowing extension. The interior is provided with an openable/closable inlet port for the raw material, fitted with a hermetically sealed valve device, and an openable/closable outlet port for the inoculated substrate fitted with a hermetically sealing valve. Furthermore, the apparatus is provided with a conveyor-mixer element extending into the hermetically sealed interior by means of a hermetically sealed rotary shaft connected to a drive and journaled in the lid. The apparatus has an inlet port for introduction of the heating steam, hot and cold water into the hermetically sealed interior, and the jacket is provided with inlet and outlet ports for the heating medium and the coolant. According to a further preferred embodiment of the apparatus of the present invention, it is provided with a hermetically sealed shaft journaled in the center of the cylindrical jacket, and scraper rods fixed to the shaft for cleaning the cylindrical jacket and the narrowing extension. According to a preferred further embodiment of the apparatus, it is provided with a conveyor mixer element for discharge of the substratum, a raw material inlet port, connected conveyor worm and inoculum grinder. In a further preferred embodiment, the apparatus is provided with an air inlet on the lower part of the narrowing extension, conveyor worm connected to the inlet port of the inoculum, and with aseptic pressure limiting valve.

In a further preferred embodiment of the apparatus a fitted shaft is arranged in the throat of the conveyor worm and connected to the inlet port of the inoculum, the throat of the conveyor worm is fitted with openable, hermetically sealed lid and water is fitted with washing heads for cleaning the interior.

The invention comprises a process for the sterile or partially sterile production of various substrates for mushroom cultivation, in that all of the steps necessary for production of the substrate, i.e. mixing, wetting, heat treatment, sterilization and cooling of the raw material and additives, admitting and mixing of the inoculum, bagging of the inoculated material take place within a hermetically sealed apparatus without manual intervention.

According to the criterion of the process, the various substrates are produced as follows. The raw materials such as straw, corn cob, corn stalk, etc., generally used for the various substrates, are introduced in suitably prepared condition. In the case of ground straw, this is preferably shorter than 5 mm; in the case of ground corn cob this is preferably of 2-6 mm grain size and in the case of ground corn stalk it is preferably in pieces of 5 mm and/or less. This raw material is introduced into a hermetically sealed apparatus constructed for this purpose. The additives that are known per se and are used for the various substrates, such as organic and/or inorganic materials used as nitrogen source, e.g. soya flour, alfalfa flour, etc. are also introduced into the apparatus. Then the apparatus is hermetically sealed, and mixing of the dry material is commenced with the agitator in the appratus. After premixing the dry material and additives, the material is wetted while the agitation is maintained.

In the process of the present invention, 60-75%, suitably 70% moisture content of the material is attained in preferably two steps. About 90% of the given moisture content is introduced into the apparatus in the form of water, preferably at 90°-100° C. temperature. The remaining 10% of the required moisture content is mixed to the already prewetted material with the injection of steam, suitably between 100° and 125° C. Purpose of the steam injection is to heat the prewetted material to the temperature of sterilization within a short time, i.e. in 5-30 minutes depending on the available steam capacity. The material is heated by liberation of the latent heat of the steam, i.e. by condensation, while the condensate participates in setting the final moisture content of the prewetted material.

The agricultural byproducts used as raw material require different sterilization times for different materials, usually between 30 and 60 minutes, and various sterilization temperatures, usually between 100° and 125° C. Sterilization of the prepared material i.e. holding the set temperature with steam injection, is assured by keeping the jacket of the apparatus at the same temperature of 100°-125° C., such as by heating the jacket with steam.

Upon completion of the sterilization, cooling of the heated material is commenced by heat extraction through the jacket of the apparatus, such as by circulation of water therein having a temperature below 20° C., and/or by condensation of the vapor. The vapor condensation takes place partially so that the interior of the apparatus is interconnected with a steam generator, as a result of which the evaporated vapors passing into the condenser dissipate the heat extracted from the material, and thereby they are condensed. The quantity of the condensate reduces the water content of the substrate, hence it is advisable to recirculate it into the apparatus, where it is mixed again with the material. The temperature of the treated raw material is lowered in this manner, but its moisture content remains the same.

The material is cooled until a temperature between 20° and 30° C., suitably 25° C. is reached.

This temperature is favorable for the vital conditions of the mushroom mycelia introduced as inoculum.

Upon completion of the cooling process, the internal vacuum of the hermetically sealed apparatus is equalized to atmospheric pressure. This is the feasible way for opening the apparatus for admission of the inoculum. The inoculum is admitted preferably from sterile space, thereby preventing the sterile material in the apparatus from becoming infected.

The proper mixing of the inoculum in the sterilized basic material is facilitated by the constant agitation and by granulation of the inoculum that is introduced into the apparatus, preferably to 1-3 mm grain size with a suitably designed granulator. Such fine dispersion of the inoculum facilitates the fast propagation of the mycelia in the basic material.

After introduction of the inoculum and uniform mixing for about 5-15 minutes, the inoculated material is filled into sealable packing material used for interweaving and/or cultivation. The bagging is carried out in sterile space under strict hygienic conditions.

Figure 1:
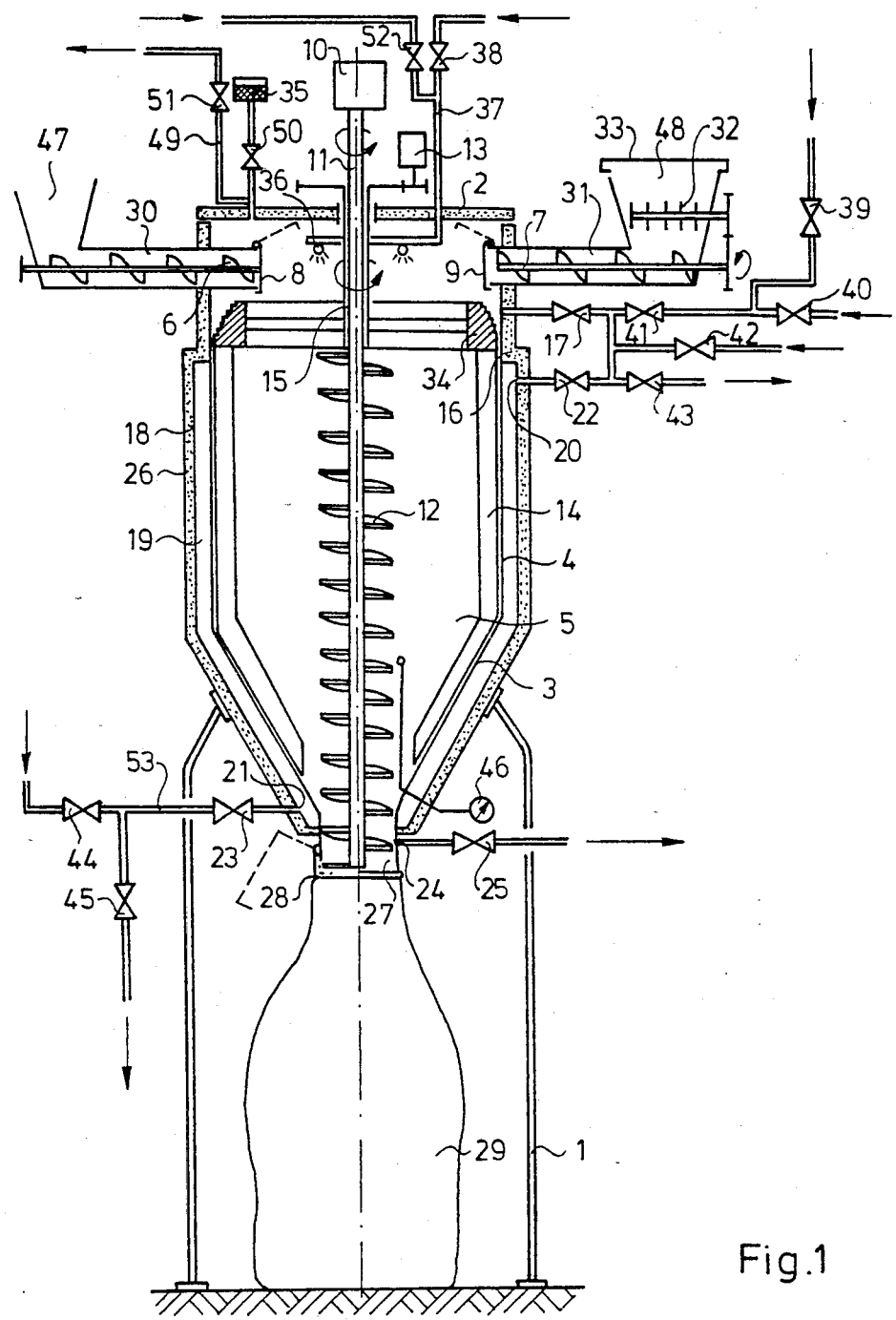
FIG. 1 shows the apparatus for preparing the inoculated substrate.

The apparatus according to the invention is described in detail by reference to the drawing comprising FIG. 1, wherein a cylindrical jacket 4 with narrowing extension 3 and lid 2 is fixed to a frame 1 forming hermetically sealed interior 5. The apparatus is provided with a raw material inlet port 6, inoculum inlet port 7 and with flap valve or gate valve closures 8 and 9 that are capable of hermetically sealing the inlet ports. A conveyor/mixer element 12 is connected to a hermetically sealed shaft 11 engaged to rotating motor 10 and journaled in lid 2. Scraper rods 14 for scraping the inner surface of the cylindrical jacket 4 are connected to a rotary drive motor 13 with the aid of the hermetically sealed and journaled outer rotating shaft 15. An inlet port 16 is formed for introduciton of heating steam and hot or cold water into the hermetically sealed interior 5, which port is connected to a valve 17. The cylindrical jacket 4 with narrowing extension 3 is surrounded by an external jacket 18 for circulation of the heating or coolant media. These media circulate one at a time in the space between the two jackets by entering into this space through ports 20 and 21. Air pressure relief port 24 connected to valve 25 is disposed at the lower part of the jacket of the narrowing extension 3. The cylindrical jacket 4 and the narrowing extension 3 are covered by an insulting layer 26. Substrate outlet port 27 controlled by an openable, hermetically sealing shut off device 28, such as a dosing feeder, for discharge of the inoculated substrate. A receiving container 29, such as a plastic bag for packing the inoculated substratum is shown connected to the substrate outlet port 27. A conveyor worm 30 is connected to the raw material inlet port 6 and conveyor worm 31 to the inoculum inlet port 7. A shaft 32 with rod is formed in a feeding throat 48 of conveyor worm 31 for the coarse comminution of the inoculum and the throat 48 is provided with hermetically sealed valve device 33. A granulating disc 34 is fixed to outer rotating shaft 15 for the fine comminution of the inoculum introduced through port 7. An aseptic pressure relief valve 35 is connected through a pipe 49 and shut off valves 50 and 51 to the interior 5, and spray heads 36 are formed for cleaning of the interior 5 connected through pipe 37 to valve 38. According to the layout shown in FIG. 1, the valves 17 and 22 are connected through pipes to the respective attachment points for hot water, cold water, steam and coolant outlet, and valves for hot water 39, cold water 40, valve 41, valve for steam 42 and coolant 43 are disposed at the respective locations shown in FIG. 1 Valve 23 with pipe 53 is connected through valves for coolant inlet 44 and coolant outlet 45 as shown in FIG. 1. A sensor temperature regulator 46 is provided for measuring the temperature of the interior 5.

The interior 5 of the apparatus is connected to a steam condenser through a vapor steam outlet through the pipe 49 and valve 51, as well as through a condensate return pipe 37, valve 52 and spray heads 36.

The apparatus for carrying out the process of the present invention, shown in FIG. 1, operates as follows.

Raw material is introduced into the throat 47 of the conveyor worm 30. From here it is delivered by the conveyor worm 30 through the raw material inlet port 8 into the interior 5, while valve 8 is open. When about ⅔ of the interior 5 is filled, then the raw material inlet port 6 is closed and hermetically sealed with valve 8. At the same time all other parts 7, 16, 20, 21, 24 and 27 are also closed by valves 9, 28, 17, 22, 23 and 25. Valves 33 and all other valves 30, 40, 41, 42, 43, 44 and 45 are also closed at this time.

Drive motors 10 and 13 are started. The rotary drive 10 turns the scraper rods through outer rotaty shaft 15. The pitch and direction of rotation of the conveyor mixer worm 12 are such that the raw material conveyed by the worm travels upwards, then falls out of the conveyor/mixer worm 12 on the top and slides down along the surface of the cylindrical jacket 4 and that of the narrowing extension 3. The material along the walls is continuously scraped off by the scraper rods 14.

Upon opening the valve 25, the air outlet port 24 is opened, then the valve 17 and steam valve 42 built into the pipe used for the direct injection of the steam are also opened. The steam flowing into the interior 5 displaces the air inside, which can be discharged through the air outlet port 24 when valve 25 is open. The valve 25 is closed upon the air having been displaced. The steam passing into the raw material under continous mixing raises the temperature of the raw material to the required level. The steam valve 42 is closed at the temperature valve set on the sensor regulator 46. Upon opening the hot water valve 29, water of fixed amount and temperature can be introduced through the steam water inlet port to the raw material for adjusting the required water content. The water is uniformly mixed into the raw material. Next the hot water valve 39, the valves 41 and 17 are also closed. The temperature of the raw material is maintained by conducting heating medium, suitably steam, into the jacket space 19 by opening the steam valve 42 and valve 22 through orifice 20 of the external jacket 18. The heating medium that cools through heat transfer is continuously discharged from the cold coolant outlet through orifice 21 of the external jacket 18 in the open position of valve 23 and the coolant out valve 45. The heating for maintaining interior temperature is stopped by closin the steam valve 42 and valve 22. Next the valve 23 and the coolant out valve 45 are closed.

The heat losses are reduced by the insulating layer 26.

By maintainence of the pressure and temperature of the apparatus interior 5 at the required lvel during heating, is regulated by the aseptic pressure limiting valve 35. The heat treated raw material is cooled by circulation of coolant in the jacket space 19, and/or by the use of vacuum condensation. In the former case, cooling is carried out by circulation of the coolant upon opening the coolant in valve 44 and valve 23, as well as valve 22 and coolant out valve 43. In the latter case, the interior 5 of the apparatus is connected to a steam condenser at the vapor steam outlet and where the condensate is returned, so that the valve 50 of pipe 49 and valve 38 of pipe 38 are closed, at the same time the valve 51 of pipe 49 and valve 52 of pipe 37 are opened. Both cooling methods are generally carried out while the raw material is mixed. The internal pressure drops during cooling. The differential pressure is equalized through the aseptic pressure relief valve 35. Upon completion of the cooling process, in the first case the coolant in valve 44 and 23, as well as valve 22 and the coolant out valve 43 are closed to stop the circulation of the coolant. In the case of vacuum condensation, the cooling process is stopped by closing the valves 38 and 52.

Upon reaching the required temperature, the lid 33 of worm throat 31 connected to the inoculum inlet port 7 is opened under sterile conditions, the inoculum is filled into the throat 48, and the lid is closed immediately. The inoculum is coarsely comminuted by the rod fitted shaft 32 driven from the shaft of worm 31. Upon opening the lid 9 of port 7 the precomminuted pieces are carried by worm 31 to the rotary granulating disc 34 for fine comminution of the inoculum, where the inoculum pieces pressed between the cylinder jacket 4 and granulating disc 34 are granulated to the required grain size of the inoculum. The comminuted inoculum falls into the substrate, where it is uniformly mixed in. In this manner, the interweaving starts from several points resulting in quick interweaving procedure. Upon introduction of admitting the inoculum, the port 7 is closed immediately with lid 9.

The inoculated substrate is discharged through the outlet port 27 by changing the direction of rotation of the rotary drive 10, whereby the conveyor worm 12 carried the inoculated substrate towards port 27, and upon opening the lid 28 under sterile conditions the substrate is poured into sterilized plastic bags or other sterilized packing containers. Following discharge of the substrate the lid 28 is closed and the work cycle is started again.

The interior 5 is cleaned, washed, disinfected as necessary by opening the valve 38, with the aid of cleaning fluid injected through spray heads 36 and pipe 37. The cleaning fluid is removed by opening the lid 28.

The apparatus has to be operated in adequately sterile location to reduce infection possibly occurring at the inoculation and bagging steps.

A plug or other closure is used for the sterile sealing of the bag of the inoculated substrate, and interwoven in adequately clean premises, then it is put to use.

The process and operation of the apparatus according to the invention prove that the wetting, heat treatment, inoculation and bagging according to the process can be carried out with the apparatus in a single hermetically sealed chamber. In this manner, the risk of infection of the substrate is reduced to the minimum in comparison with the known methods. The simple construction of the apparatus results in production at a favorably low investment. The process can also be carried out with automated control of the apparatus, hence it can be run with the use of minimal human labor and the work phases can be kept on constant timing independently from the operator. The steps are carried out in a single space without intermediate material handling. The apparatus can be easily manufactured for the processing of large quantities, that is several cubic meters of basic material. The space requirement is favorably low, consequently strict hygienic conditions are required only in a small part of the building, which reduces the required investment capital. Accordingly, the process and apparatus are suitable for large scale production.

We claim:

1. A process for the at least partially sterile preparation, inoculation, and packaging of substrate for mushroom growing, which comprises the steps of:
   (a) comminuting a dry base material of straw and/or corn cob to a maximum particle size of 6 mm;
   (b) mixing the comminuted base material with one or more organic and/or inorganic additives in a closed system;
   (c) introducing hot water into the system so that the base material mixture attains a higher moisture content;
   (d) introducing steam into the system for increasing the moisture content of the base material mixture;
   (e) heating the closed system for sterilizing the basic material mixture;
   (f) cooling the base material mixture to about ambient temperature while maintaining agitation thereof;
   (g) equalizing the internal pressure of the closed system with the pressure outside of said syatem;
   (h) introducing an inoculum from a sterile space into the system;
   (i) mixing the base mixture with the inoculum; and
   (j) transferring the resulting mixture from the at least partially sterile space into closed sterile storage for cultivation.

2. The process of claim 1, wherein the additive is soya flour.

3. The process of claim 1, wherein the moisture content of the base mixture is further increased by up to 7.5% by exposure to at least 110 degree centigrade steam for at least 15 minutes.

4. The process of claim 1, wherein the base mixture is sterilized by exposure to at least 115 degrees centigrade steam for at lleast 35 minutes.

5. The process of claim 1. wherein the base mixture is cooled to at most 25 degrees centigrade.

6. The process of claim 1, wherein the inoculum introduced into the closed system has a particle size of about 1.5 mm.

7. The process of claim 1, wharein the base mixture is mixed with the inoculum at a speed of about 30 r.p.m. for at leat 5 minutes.

* * * * *